United States Patent
Chajec

(10) Patent No.: US 9,684,313 B2
(45) Date of Patent: Jun. 20, 2017

(54) AUTOMATIC DRAIN FOR FUEL PROCESSOR

(71) Applicant: DAVCO TECHNOLOGY, LLC, Saline, MI (US)

(72) Inventor: Zdzislaw W. Chajec, Saline, MI (US)

(73) Assignee: Davco Technology, LLC, Saline, MI (US)

( * ) Notice: Subject to any disclaimer, the term of this patent is extended or adjusted under 35 U.S.C. 154(b) by 154 days.

(21) Appl. No.: 14/215,751

(22) Filed: Mar. 17, 2014

(65) Prior Publication Data

US 2014/0261773 A1 Sep. 18, 2014

Related U.S. Application Data

(60) Provisional application No. 61/791,382, filed on Mar. 15, 2013.

(51) Int. Cl.
*B01D 3/42* (2006.01)
*G05D 9/12* (2006.01)
(Continued)

(52) U.S. Cl.
CPC ............. *G05D 9/12* (2013.01); *B01D 36/006* (2013.01); *F02M 37/221* (2013.01); *Y10T 137/7313* (2015.04)

(58) Field of Classification Search
CPC ...... G05D 9/12; F02M 37/221; B01D 36/006; Y10T 137/7313; Y10T 137/3024;
(Continued)

(56) References Cited

U.S. PATENT DOCUMENTS 3,088,592 A * 5/1963 Clark ........................ G05D 9/12
137/172
3,578,005 A * 5/1971 Jurion ..................... C02F 1/686
137/205.5
(Continued)

FOREIGN PATENT DOCUMENTS

CN 102470298 A 5/2012
DE 37 01 259 A1 7/1987
(Continued)

OTHER PUBLICATIONS

Machine translation of DE102007039661A1, taken from the internet on Espacenet website on Oct. 26, 2015, <URL;http://www.espacenet.com>.*
(Continued)

*Primary Examiner* — Craig J Price
(74) *Attorney, Agent, or Firm* — Young Basile Hanlon & MacFarlane, P.C.

(57) ABSTRACT

An automatic water drain apparatus includes a reservoir, a fluid inlet, and a fluid outlet. A first valve member is moveable between an open position for admitting fluid to the reservoir via the fluid inlet and a closed position for preventing admission of fluid to the reservoir. A second valve member is moveable between an open position for exhausting fluid from the reservoir and a closed position for preventing exhaust of fluid from the reservoir. At least one actuator is operable to move the fluid inlet and the fluid outlet between their respective open and closed positions. A sensor is disposed outside the reservoir and is operable to produce a first sensor output signal in response to detection of the presence of water, wherein the at least one actuator moves the first valve to the open position in response to the first sensor output signal.

19 Claims, 7 Drawing Sheets

(51) Int. Cl.
 *B01D 36/00* (2006.01)
 *F02M 37/22* (2006.01)
(58) Field of Classification Search
 CPC ........... Y10T 137/304; Y10T 137/3052; Y10T 137/7306; Y10T 137/86196; Y10T 137/8158; Y10T 137/86911; Y10T 137/86919; G03D 3/065; G03D 2203/0658
 USPC ....... 137/395, 392, 558, 572, 551, 178, 183, 137/187, 101.25, 628, 630.15
 See application file for complete search history.

(56) References Cited

U.S. PATENT DOCUMENTS

| | | | |
|---|---|---|---|
| 4,372,847 A | 2/1983 | Lewis | |
| 4,480,901 A * | 11/1984 | Osegowitsch | G03D 3/065 137/392 |
| 4,539,109 A * | 9/1985 | Davis | F02M 37/221 123/557 |
| 4,680,110 A | 7/1987 | Davis | |
| 5,480,063 A * | 1/1996 | Keyes | G01F 11/284 137/563 |
| 5,680,960 A * | 10/1997 | Keyes | G01F 11/284 137/563 |
| 5,954,078 A * | 9/1999 | Chiang | H01L 21/67075 118/408 |
| 6,783,665 B1 | 8/2004 | Girondi | |
| 7,104,422 B2 * | 9/2006 | DiLeo | B67D 1/1234 222/204 |
| 7,118,011 B2 * | 10/2006 | Proulx | B67C 3/204 222/129 |
| 7,228,992 B2 * | 6/2007 | Belongia | G01F 11/284 137/587 |
| 7,850,846 B2 | 12/2010 | De La Azuela et al. | |
| 7,896,197 B2 * | 3/2011 | Furey | B67D 1/0012 222/64 |
| 7,976,700 B2 | 7/2011 | Arakawa et al. | |
| 2001/0001962 A1 * | 5/2001 | Weishew | F16K 21/18 137/392 |
| 2006/0070956 A1 | 4/2006 | Herrmann et al. | |
| 2006/0207924 A1 | 9/2006 | De La Azuela et al. | |
| 2009/0211959 A1 | 8/2009 | Clint et al. | |
| 2010/0096304 A1 * | 4/2010 | Ganswein | F02M 37/221 210/86 |
| 2010/0101984 A1 | 4/2010 | Roesgen et al. | |
| 2011/0100477 A1 * | 5/2011 | Miller | F22B 1/284 137/14 |
| 2011/0127211 A1 | 6/2011 | Han et al. | |
| 2011/0174717 A1 | 7/2011 | Braunheim et al. | |
| 2011/0186501 A1 | 8/2011 | Braunheim et al. | |

FOREIGN PATENT DOCUMENTS

| | | |
|---|---|---|
| DE | 10 2007 039661 A1 | 3/2008 |
| DE | 10 2009 052301 A1 | 5/2011 |
| EP | 1 555 424 A1 | 7/2005 |
| GB | 2 440 914 A | 2/2008 |

OTHER PUBLICATIONS

Machine translation of DE102009052301, May 12, 2011, Espacenet website, (Retrieved on Aug. 29, 2016).*

* cited by examiner

AUTOMATIC DRAIN FOR FUEL PROCESSOR

CROSS-REFERENCE TO RELATED APPLICATIONS

This application claims the benefit of U.S. Provisional Application Ser. No. 61/791,382, filed on Mar. 15, 2013, which is incorporated herein in its entirety by reference.

TECHNICAL FIELD

This disclosure relates to the field of separating water from fuel.

BACKGROUND

In some fuel processing applications, water is mixed into the fuel and needs to be separated from the fuel before the fuel is utilized. One example arises in the context of a diesel fuel processor for a diesel internal combustion engine. The diesel fuel processor may include a housing with a filter media therein for removing particulate contaminants from the diesel fuel. In some previous designs of diesel fuel processors, a reservoir is provided below the area where the diesel fuel passes through the filter media. Because water is heavier than fuel, water will tend to separate from the fuel and collect in the bottom of the reservoir. Occasionally, the reservoir will need to be drained. Some designs utilize manual drains, but this creates a need for ongoing maintenance. Some designs have proposed automatic drains, but need remains for an automatic drain that minimizes the risk that fuel is released from the automatic drain into the environment.

SUMMARY

One aspect of the disclosed embodiments is an automatic water drain apparatus that includes a reservoir, a fluid inlet that is in fluid communication with the reservoir, and a first valve member that is moveable between an open position for admitting fluid to the reservoir via the fluid inlet and a closed position for preventing admission of fluid to the reservoir via the fluid inlet. The apparatus also includes a fluid outlet that is in fluid communication with the reservoir, and a second valve member that is moveable between an open position for exhausting fluid from the reservoir and a closed position for preventing exhaust of fluid from the reservoir. The apparatus includes at least one actuator that is operable to move the fluid inlet and the fluid outlet between their respective open and closed positions. A sensor is disposed outside the reservoir and is operable to produce a first sensor output signal in response to detection of the presence of water. The at least one actuator moves the first valve to the open position in response to the first sensor output signal.

Another aspect of the disclosed embodiments is an automatic drain assembly including a container having water disposed within an interior of the container, a reservoir, a fluid inlet that is in fluid communication with the reservoir and the interior of the container, and a first valve member that is moveable between an open position for admitting water from the container to the reservoir via the fluid inlet and a closed position for preventing admission of water to the reservoir from the container via the fluid inlet. The apparatus also includes a fluid outlet that is in fluid communication with the reservoir, and a second valve member that is moveable between an open position for exhausting fluid from the reservoir and a closed position for preventing exhaust of fluid from the reservoir. The apparatus also includes at least one actuator that is operable to move the fluid inlet and the fluid outlet between their respective open and closed positions. The apparatus further includes a sensor that is disposed in the interior of the container and is operable to generate a first sensor output signal in response to a high water level in the container and a second sensor output signal in response to a low water level in the container. The first sensor output signal causes the at least one actuator to move the first valve member to the open position and the second sensor output signal causes the at least one actuator to move the first valve member to the closed position.

Another aspect of the disclosed embodiments is an automatic drain assembly includes a container having a volume of water and a volume of fuel disposed within an interior of the container, a housing that is connected to the container, a reservoir disposed within the housing, a fluid inlet that is defined by the housing and is positioned adjacent to a top surface of the housing, wherein the fluid inlet is in fluid communication with the reservoir and the interior of the container, and a first valve member that is moveable between an open position for admitting water from the container to the reservoir via the fluid inlet and a closed position for preventing admission of water to the reservoir from the container via the fluid inlet. The apparatus also includes a fluid outlet that is defined by the housing and is positioned adjacent to a bottom surface of the housing, wherein the fluid outlet is in fluid communication with the reservoir, and a second valve member that is moveable between an open position for exhausting fluid from the reservoir and a closed position for preventing exhaust of fluid from the reservoir. The apparatus also includes at least one actuator that is operable to move the fluid inlet and the fluid outlet between their respective open and closed positions, and a sensor that is disposed in the interior of the container and is operable to generate a first sensor output signal in response to a high water level in the container and a second sensor output signal in response to a low water level in the container. The first sensor output signal causes the at least one actuator to move the first valve member to the open position and the second sensor output signal causes the at least one actuator to move the first valve member to the closed position.

BRIEF DESCRIPTION OF THE DRAWINGS

The various features, advantages and other uses of the present apparatus will become more apparent by referring to the following detailed description and drawing in which.

DETAILED DESCRIPTION

The disclosure herein relates to an automatic water drain apparatus for fuel processors, such as diesel fuel filter assemblies. The automatic water drain apparatus is installed in communication with a container in which water separates from fuel by collecting at the bottom of the container. A sensor is utilized by the automatic water drain apparatus to open a first valve that causes water from the container to flow into a reservoir within the automatic water drain apparatus. The sensor closes the first valve prior to the point at which the water level within the container would become low enough that fuel might enter the reservoir of the automatic water drain apparatus. When the first valve is closed, a second valve is opened, and the second valve allows the water within the reservoir to pass out of the automatic water drain apparatus while the reservoir is blocked from fluid communication with the container. A filter can be installed within the reservoir for removing impurities from the water that is removed from the container before it is discharged from the automatic water drain apparatus.

Figure 1:
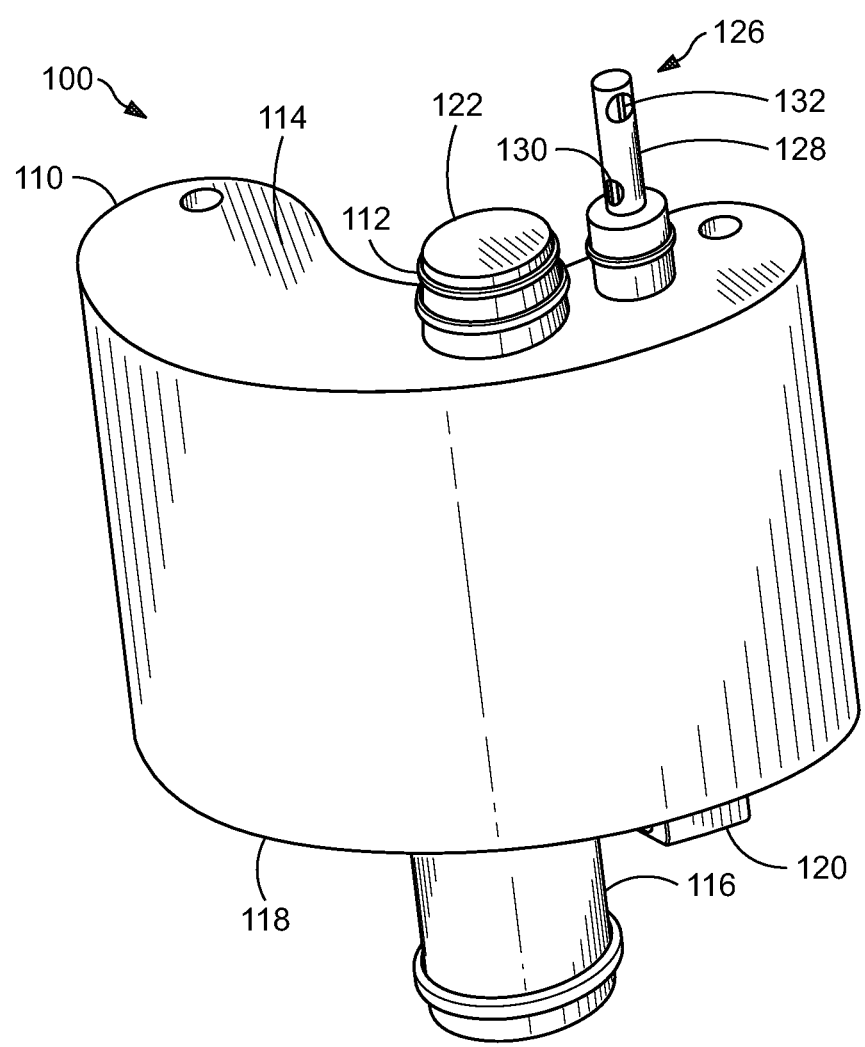
FIG. 1 is a top perspective view showing an automatic water drain apparatus.
Figure 2:
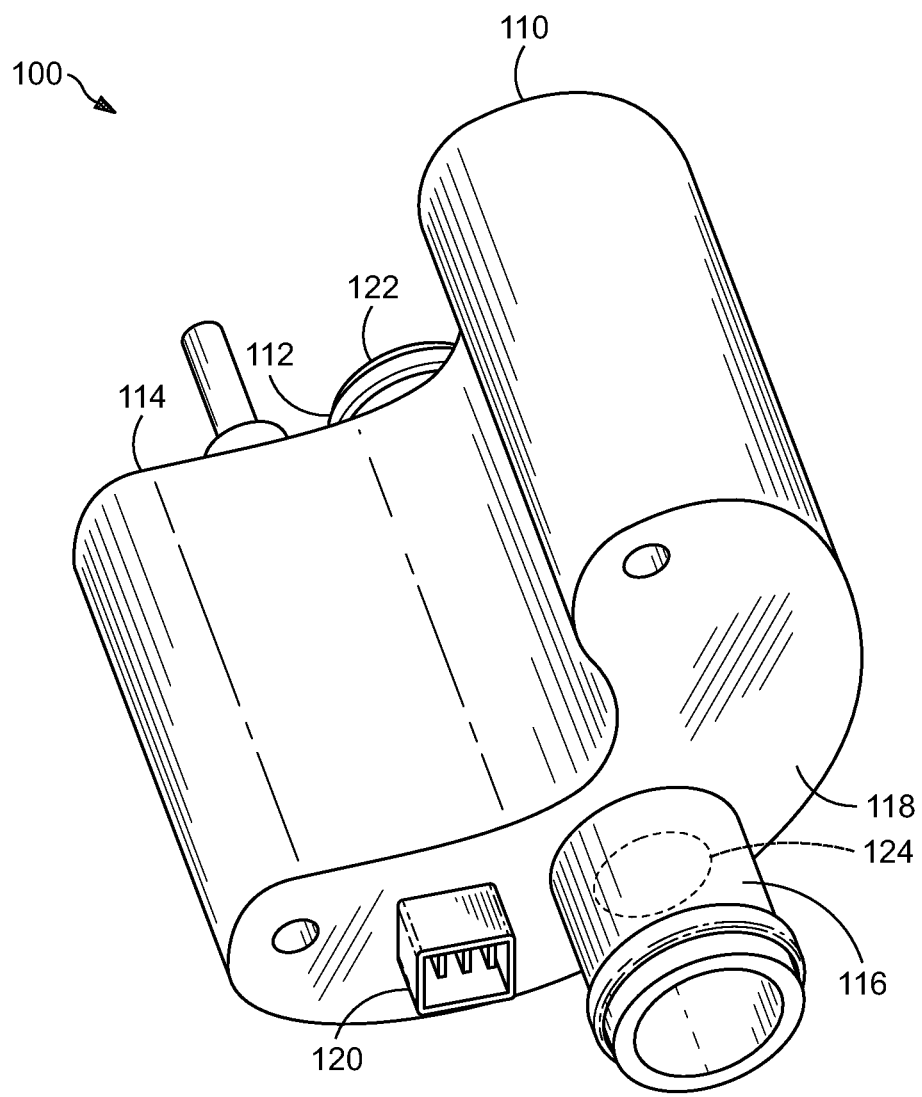
FIG. 2 is a bottom perspective view of the automatic water drain apparatus.

As shown in FIGS. 1-2, an automatic water drain apparatus 100 includes a housing 110 having a fluid inlet 112 positioned adjacent to a top surface 114 thereof and a fluid outlet 116 positioned adjacent to a bottom surface 118 thereof. The fluid inlet 112 and the fluid outlet 116 can, in some implementations, be substantially tubular members that extend outward from the top surface 114 and the bottom surface 118, respectively. An electrical connector 120 can be provided on the housing for connection to a source of electrical power and/or control signals. The electrical connector 120 can be positioned on the bottom surface 118 of the housing 110, but other locations would also be suitable for the electrical connector 120.

In order to selectively open and close the fluid inlet 112, a first valve member 122 is provided for selectively opening and closing with respect to the fluid inlet 112. When the first valve member 122 is in its closed position, fluid is prevented from entering or exiting the fluid inlet 112. When the first valve member 122 is in its open position, fluid communication is permitted through the fluid inlet 112.

In order to selectively establish or prevent fluid communication at the fluid outlet 116, a second valve member 124 is positioned at the fluid outlet 116. The second valve member 124 is operable to selectively establish or prevent fluid communication at the fluid outlet 116. In particular, the second valve member 124 is moveable from a closed position, wherein fluid communication is blocked at the fluid outlet 116 to an open position where fluid communication is permitted at the fluid outlet 116.

In order to control opening and closing of the first valve member 122 and the second valve member 124, the automatic water drain apparatus 100 includes a sensor assembly 126 for detecting the presence of water in fuel. The sensor assembly 126 can be configured to provide at least a first signal when the presence of water is detected and at least a second signal when the presence of water is not detected. In the illustrated example, however, the sensor assembly 126 is a bi-level sensor, which can detect and provide output signals corresponding to the presence or absence of water at two separate locations on the sensor. The two locations for water sensing by the sensor assembly 126 can be located at different elevations along the sensor assembly 126 with respect to the top surface 114 and/or the fluid inlet 112 of the housing 110.

In one implementation, the sensor assembly 126 includes a probe body 128 that extends generally upward with respect to the top surface 114 of the housing 110. A first sensor 130 is positioned on the probe body 128 at a first elevation with respect to the top surface 114 and/or the fluid inlet 112. In particular, the first sensor 130 can be positioned at an elevation that is higher than the elevation of the top of the fluid inlet 112. Thus, the first sensor 130 can function to output a signal that causes the first valve member 122 to be closed before the top surface of the water that is in contact with the sensor assembly 126 reaches the fluid inlet 112. The sensor assembly 126 can also include a second sensor 132 that is positioned at a second elevation with respect to the top surface 114 and/or the fluid inlet 112 of the housing 110. The second elevation is higher than the first elevation. The second sensor 132 can be utilized to output a signal that causes the first valve member 122 to open when the second sensor 132 detects the presence of water. Thus, the first sensor 130 and the second sensor 132 can, in cooperation, output signals that cause the first valve member 122 to open when a high water level is detected and cause the first valve member 122 to close when a low water level is detected, where the low water level is higher than the top of the fluid inlet 112, such that fuel is prevented from entering the fluid inlet 112.

Each of the first sensor 130 and the second sensor 132 can include one or more electrical elements that are operable to sense the presence of water. Any suitable type of water sensor can be utilized. In one example, one or more electrodes are provided at each of the first sensor 130 and the second sensor 132, and an electrical property of the one or more electrodes is monitored to determine whether the electrodes are immersed in water. For example, the first sensor 130 could include two electrodes that are spaced apart and electrically isolated with respect to one another by an insulating body. However, when water contacts both of the electrodes, an electrical property that can be measured across the electrodes changes, such as resistance or capacitance. In response to this change in the electric property, the signals output by the sensor assembly 126 can be interpreted as indicating the presence or absence of water at the first sensor 130.

Figure 3:
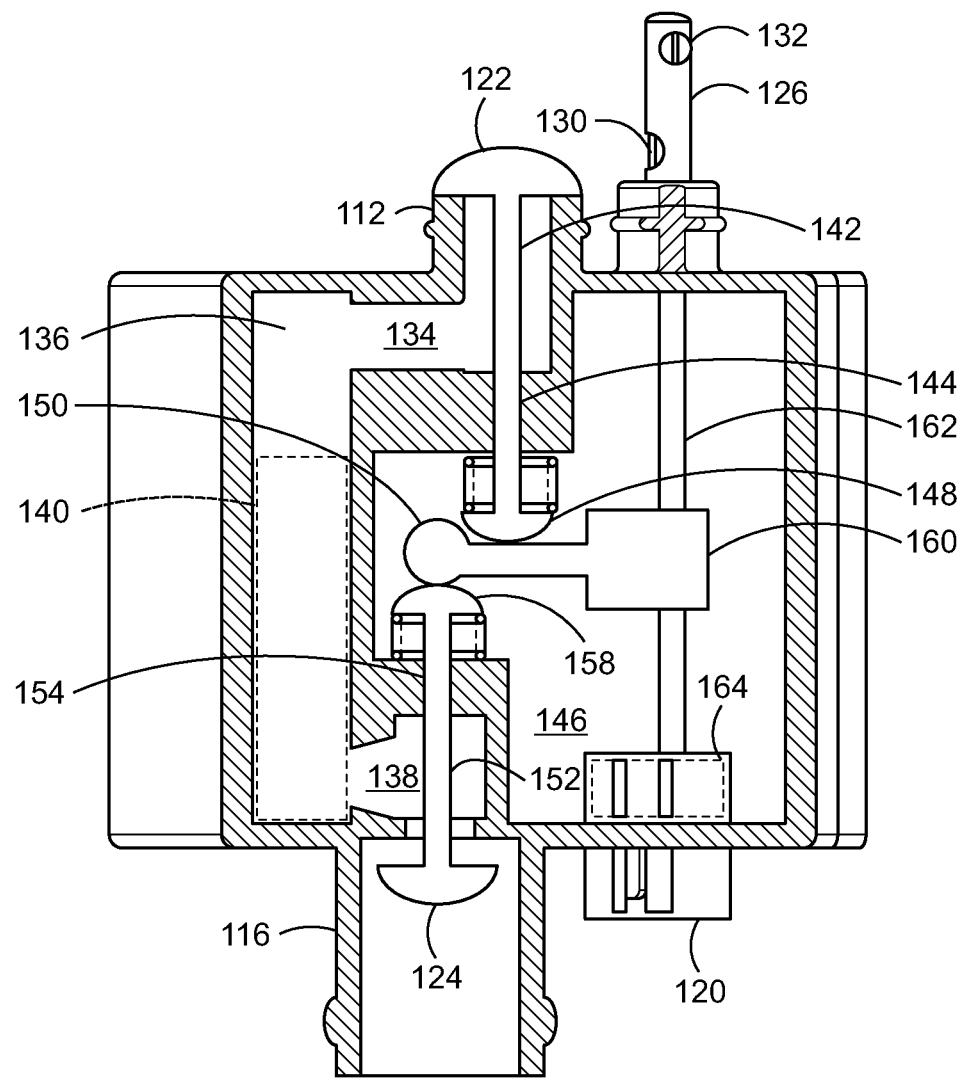
FIG. 3 is a cross-section view of the automatic water drain apparatus.
Figure 4:
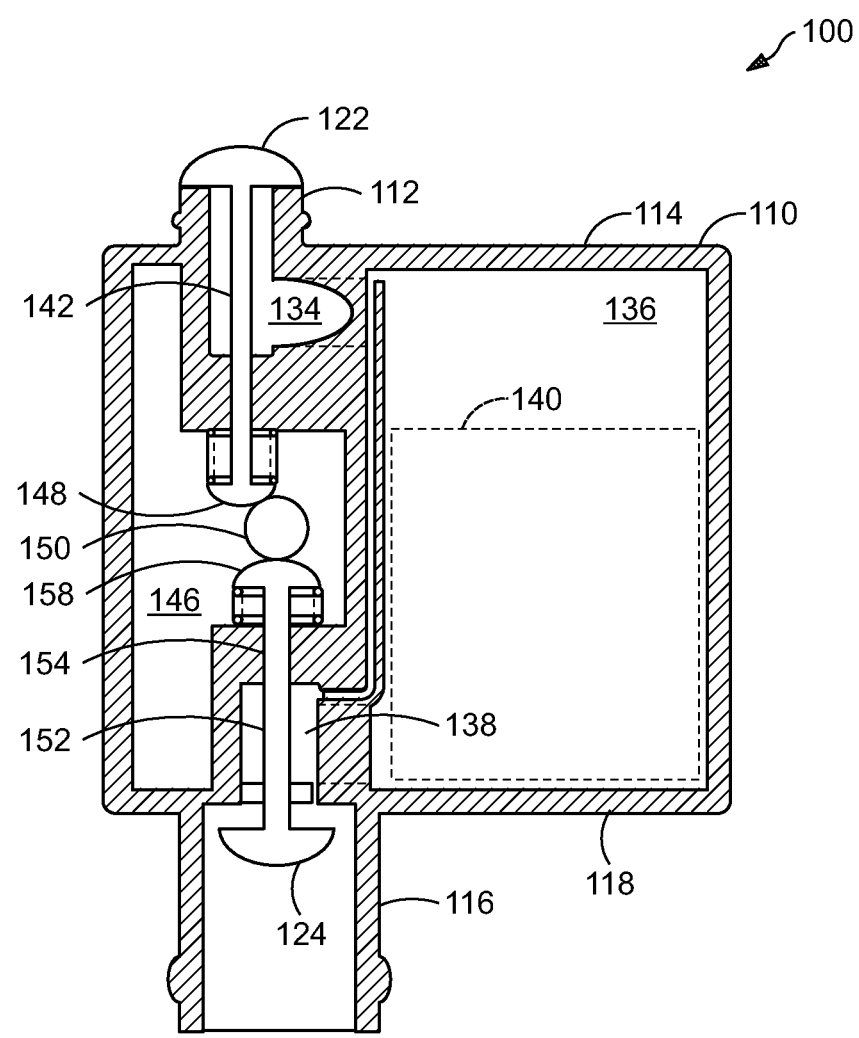
FIG. 4 is a cross-section view of the automatic water drain apparatus showing an air passageway.

As shown in FIGS. 3-4, the fluid inlet 112 defines an inlet passageway 134 that is in fluid communication with a fluid chamber or fluid reservoir 136 for storing water within the housing 110. The fluid outlet 116 defines an outlet passageway 138 that is in fluid communication with the fluid reservoir 136 for receiving the fluid from the fluid reservoir 136 and passing the fluid out of the fluid outlet 116 when the second valve member 124 is in the open position thereof. In order to remove contaminants from the water that is received within the fluid reservoir 136, a filter media 140 can be disposed within the fluid reservoir 136. In one implementation, the filter media 140 is a charcoal filter.

The first valve member 122 is connected to a first valve stem 142. The first valve stem 142 extends through the inlet passageway 134 and through an aperture 144 of the housing 110. The aperture 144 extends from the inlet passageway 134 to an actuator chamber 146 that is located within the housing 110. The aperture 144 is sized and configured complementarily to the size and shape of the first valve stem 142, such that the first valve stem 142 occupies substantially all of the aperture 144 to prevent fluid from entering the actuator chamber 146 from the inlet passageway 134. A first valve end portion 148 is connected to the first valve stem 142 and is engageable with or connected to an actuator member 150.

The second valve member 124 is connected to a second valve stem 152. The second valve stem 152 extends through the outlet passageway 138 and through an aperture 154 of the housing 110. The aperture 154 extends from the outlet passageway 138 to the actuator chamber 146. The aperture 154 is sized and configured complementarily to the size and shape of the second valve stem 152, such that the second valve stem 152 occupies substantially all of the aperture 154 to prevent fluid from entering the actuator chamber 146 from the outlet passageway 138. A second valve end portion 158 is connected to the second valve stem 152 and is engageable with or connected to the actuator member 150.

The actuator member 150 is operable to move the first valve member 122 and the second valve member 124 between their respective open and closed positions. For example, the actuator member 150 can be engageable with or connected to the first valve end portion 148 and the second valve end portion 158. The actuator member 150 is part of or connected to an actuator such as an electrically-operated solenoid actuator 160 that is operable to move with respect to a support member 162 between a first position and a second position in response to energization and de-energization of the solenoid actuator 160. For example, when the solenoid actuator 160 is in the first position, the first valve member 122 can be in its closed position, and the second valve member 124 can be in its open position. When the solenoid actuator 160 is in the second position, the first valve member 122 can be in the open position, and the second valve member 124 can be in the closed position.

The solenoid actuator 160 is controlled by signals received from a control unit 164, which can be a programmable controller that is operable to execute program instructions that, when executed, cause movement of the solenoid actuator 160 in response to control signals that are received from the sensor assembly 126. In other implementations, the control unit 164 can be special purpose hardware that causes appropriate movement of the solenoid actuator 160 in response to the control signals that are received from the sensor assembly 126. The control unit 164 can receive power from the electrical connector 120 and can be in electrical communication with the sensor assembly 126 and the solenoid actuator 160 for receiving signals from the sensor assembly 126 and for outputting control signals to the solenoid actuator 160 for causing movement of the solenoid actuator 160.

Operation of the automatic water drain apparatus 100 will now be explained with reference to FIGS. 5A-5C. The automatic water drain apparatus 100 is installed with respect to a container 200 having a volume of water 210 and a volume of fuel 220 disposed therein. The automatic water drain apparatus 100 is installed with respect to the container such that the fluid inlet 112 and the sensor assembly 126 are in communication with the interior of the container.

Figure 5A:
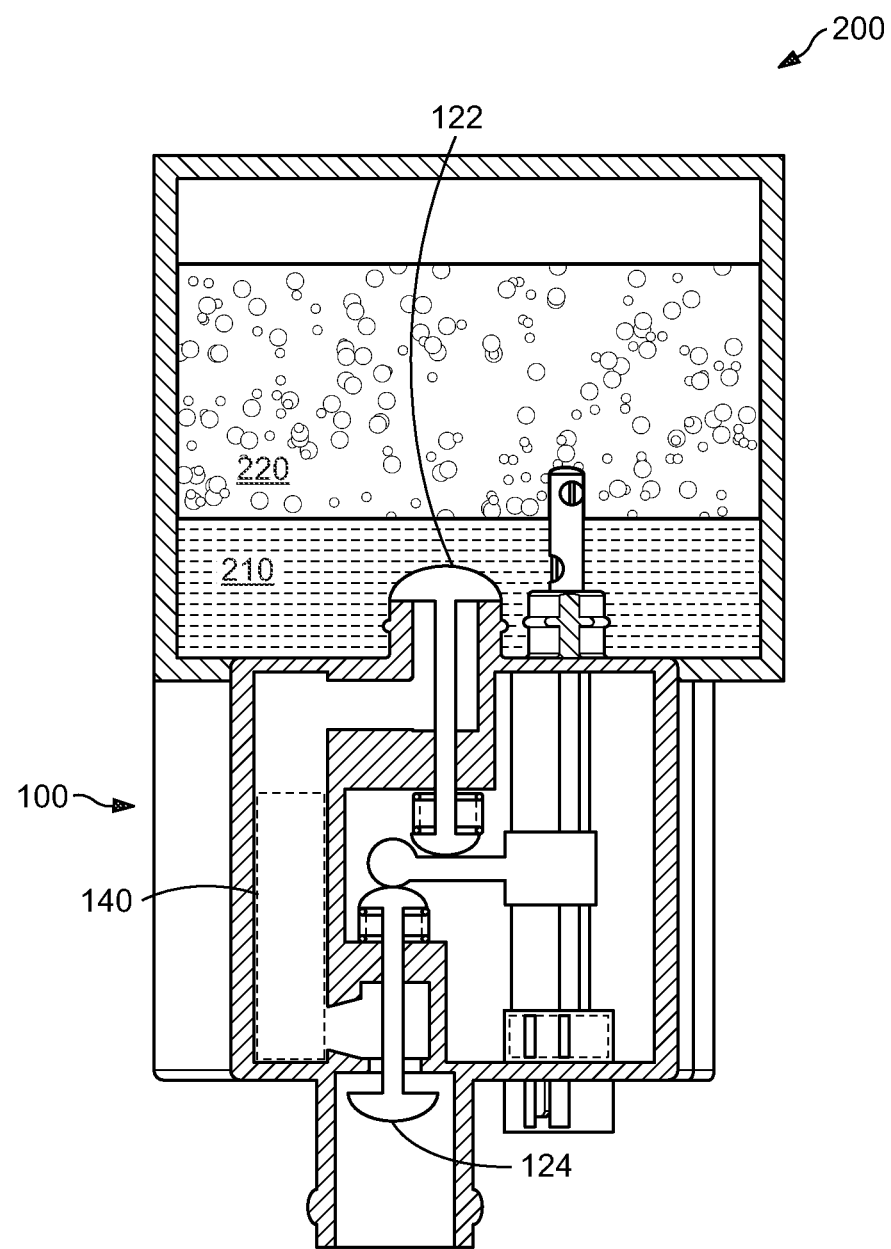
FIGS. 5A-5C are cross-section views showing operation of the automatic water drain apparatus.

In FIG. 5A, the water level in the container 200 is above the first sensor 130 of the sensor assembly 126 but is below the second sensor 132 of the sensor assembly 126. Because the second sensor 132 is not submerged in the water 210, the control unit 164, based on the signals received from the sensor assembly 126, maintains the first valve member 122 in the closed position and maintains the second valve member 124 in the open position.

Figure 5B:
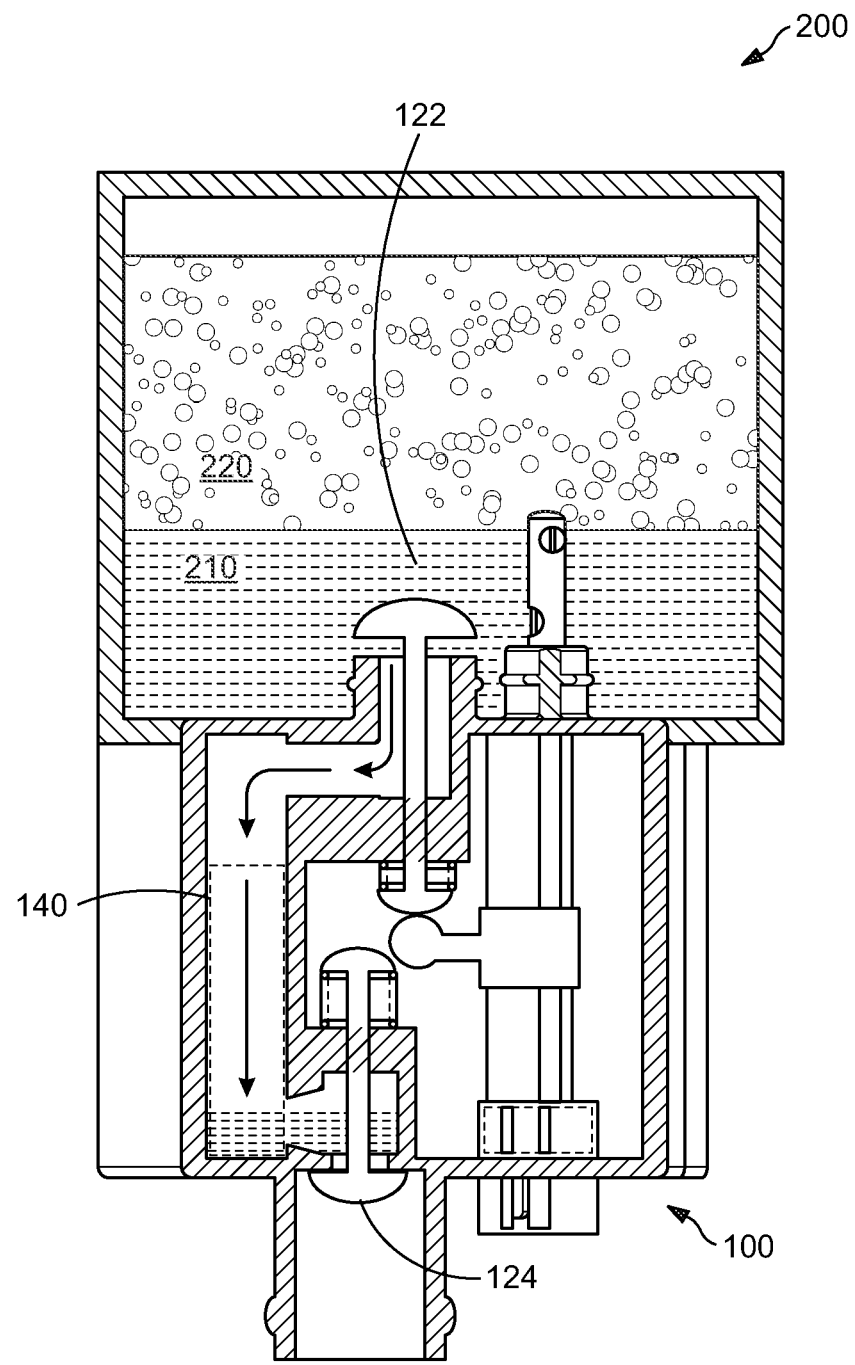
Figure 5C:
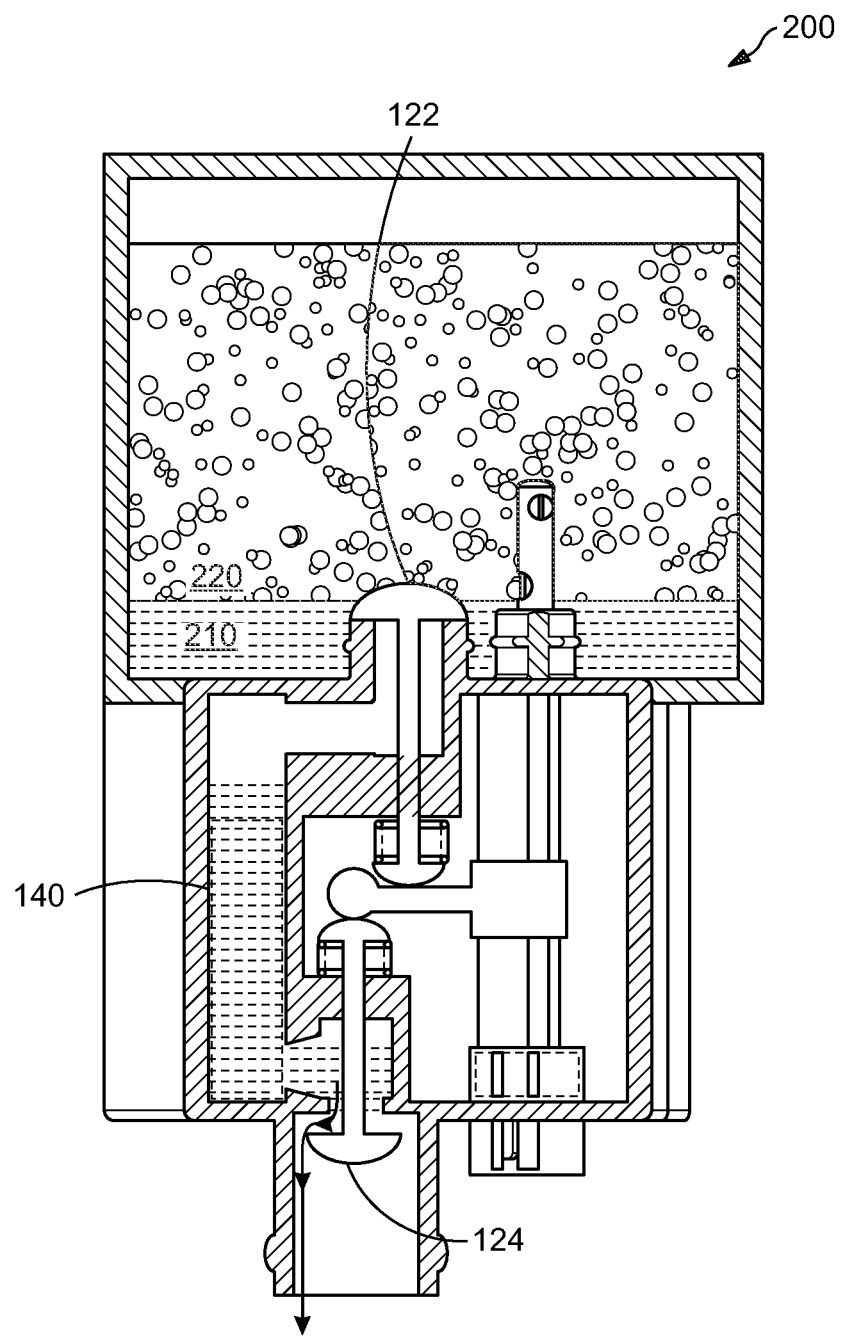

In FIG. 5B, the fluid level of the water 210 has risen such that the second sensor 132 is submerged in the water 210. Upon receiving a sensor output signal from the sensor assembly 126 indicating that the second sensor 132 is submerged in the water 210, the control unit 164 energizes the solenoid actuator 160 to move the first valve member 122 to the open position. The second valve member 124 is simultaneously moved to the closed position in response to movement of the solenoid actuator 160. With the first valve member 122 in the open position, a portion of the water enters the fluid inlet 112 and begins to fill the fluid reservoir 136 of the automatic water drain apparatus 100. Because the second valve member 124 is in the closed position, the water that enters the automatic water drain apparatus 100 is maintained within the fluid reservoir 136 while the first valve member 122 is open.

When the fluid level of the water 210 within the container 200 drops below the first sensor 130 of the sensor assembly 126, the control unit 164 receives a sensor output signal from the sensor assembly 126 indicating an absence of water at the second sensor 132, and in response to this sensor output signal, the control unit 164 de-energizes the solenoid actuator 160. In response to de-energization of the solenoid actuator 160, the first valve member 122 moves to the closed position, and the second valve member 124 moves to the open position, as shown in FIG. 5C. At this time, the fluid reservoir 136, which is filled with the water 210 received from the container 200, is now in fluid communication with the fluid outlet 116, and the water that is present in the fluid reservoir 136 exits the fluid reservoir 136 through the fluid outlet 116. As the water passes through the fluid reservoir 136, it is filtered by the filter media 140, thereby reducing the incidence of contaminants present in the water that exits the automatic water drain apparatus 100 at the fluid outlet 116.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An automatic water drain apparatus for draining water from a container, comprising:
    a housing installable with respect to the container;
    a reservoir disposed within the housing;
    a fluid inlet that is in fluid communication with the reservoir;
    a first valve that is moveable between an open position for admitting fluid to the reservoir via the fluid inlet and a closed position for preventing admission of fluid to the reservoir via the fluid inlet, wherein the first valve abuts an uppermost outer surface of the housing;
    a fluid outlet that is in fluid communication with the reservoir;
    a second valve that is moveable between an open position for exhausting fluid from the reservoir via the fluid outlet and a closed position for preventing exhaust of fluid from the reservoir via the fluid outlet;
    at least one actuator that is disposed within the housing and operable to move the first valve and the second valve between their respective open and closed positions; and
    a sensor assembly that is disposed outside the reservoir and is operable to produce a second sensor output signal in response to detection of a presence of water in the container, wherein the at least one actuator moves the first valve to the open position in response to the second sensor output signal.

2. The automatic water drain apparatus of claim 1, wherein the sensor assembly is operable to detect a high water level and a low water level.

3. The automatic water drain apparatus of claim 2, wherein the sensor assembly is operable to generate the second sensor output signal in response to detecting the high water level and a first sensor output signal in response to detecting the low water level.

4. The automatic water drain apparatus of claim 1, wherein the sensor assembly includes a first sensor for generating a first sensor output signal in response to detecting a low water level and a second sensor for generating the second sensor output signal in response to detecting a high water level.

5. The automatic water drain apparatus of claim 4, wherein the first sensor and the second sensor each include one or more water sensing electrodes.

6. The automatic water drain apparatus of claim 4, wherein the fluid inlet is disposed at a first elevation, the first sensor is disposed at a second elevation that is above the first elevation, and the second sensor is disposed at a third elevation that is above the second elevation.

7. The automatic water drain apparatus of claim 1, further comprising:
a filter media that is disposed within the reservoir to remove contaminants from water in the reservoir.

8. The automatic water drain apparatus of claim 1, further comprising:
a control unit that receives signals from the sensor assembly and causes operation of the at least one actuator in response to the signals received from the sensor assembly.

9. The automatic water drain apparatus of claim 1, wherein the sensor assembly includes a probe body that extends upward from a top surface of the housing.

10. An automatic drain assembly, comprising:
a container having water disposed within an interior of the container;
a housing installable with respect to the container and having a first chamber and a second chamber;
a reservoir defined by the first chamber of the housing;
a fluid inlet that is in fluid communication with the reservoir and the interior of the container;
a first valve member that is moveable between an open position for admitting water from the container to the reservoir via the fluid inlet and a closed position for preventing admission of water to the reservoir from the container via the fluid inlet;
a fluid outlet that is in fluid communication with the reservoir;
a second valve member that is moveable between an open position for exhausting fluid from the reservoir via the fluid outlet and a closed position for preventing exhaust of fluid from the reservoir via the fluid outlet;
at least one actuator that is disposed within the second chamber of the housing and operable to move the first valve member and the second valve member between their respective open and closed positions; and
a sensor assembly that is disposed in the interior of the container and is operable to generate a first sensor output signal in response to a low water level in the container and a second sensor output signal in response to a high water level in the container, wherein the first sensor output signal causes the at least one actuator to move the first valve member to the closed position and the second valve member to the open position and the second sensor output signal causes the at least one actuator to move the first valve member to the open position and the second valve member to the closed position.

11. The automatic drain assembly of claim 10, wherein a volume of water and a volume of fuel are disposed within the container.

12. The automatic drain assembly of claim 10, wherein the sensor assembly includes a first sensor for generating the first sensor output signal and a second sensor for generating the second sensor output signal.

13. The automatic drain assembly of claim 12, wherein the first sensor and the second sensor each include one or more water sensing electrodes.

14. The automatic drain assembly of claim 10, further comprising:
a filter media that is disposed within the reservoir to remove contaminants from water in the reservoir.

15. The automatic drain assembly of claim 10, wherein a top surface of the housing is substantially flush with a bottom surface of the container.

16. An automatic drain assembly, comprising:
a container having a volume of water and a volume of fuel disposed within an interior of the container;
a housing installable with respect to the container;
a reservoir disposed within the housing;
a fluid inlet that is defined by the housing and is in fluid communication with the reservoir and the interior of the container;
a first valve member that is moveable between an open position for admitting water from the container into the reservoir via the fluid inlet and a closed position for preventing admission of water into the reservoir from the container via the fluid inlet;
a fluid outlet that is defined by the housing and is in fluid communication with the reservoir;
a second valve member that is moveable between an open position for draining water from the reservoir via the fluid outlet and a closed position for preventing draining of water from the reservoir via the fluid outlet;
at least one actuator that is disposed within the housing and operable to move the first valve member and the second valve member between their respective open and closed positions; and
a sensor assembly that is disposed in the interior of the container and extends upward from the housing, wherein the sensor assembly is operable to generate a first sensor output signal in response to a low water level in the container and a second sensor output signal in response to a high water level in the container, wherein the first sensor output signal causes the at least one actuator to move the first valve member to the closed position and the second valve member to the open position and the second sensor output signal causes the at least one actuator to move the first valve member to the open position and the second valve member to the closed position, wherein water that has been admitted into the reservoir is drained prior to the at least one actuator moving the second valve member to the closed position.

17. The automatic drain assembly of claim 16, wherein the sensor assembly includes a first sensor for generating the first sensor output signal and a second sensor for generating the second sensor output signal.

18. The automatic drain assembly of claim 17, wherein the first sensor and the second sensor each include one or more water sensing electrodes.

19. The automatic drain assembly of claim 18, further comprising:
a filter media that is disposed within the reservoir to remove contaminants from water in the reservoir.

* * * * *